Jan. 26, 1965   A. SONNTAG ETAL   3,166,927
LUBRICANT TESTING MACHINE
Filed May 17. 1961   5 Sheets-Sheet 1

INVENTORS
Alfred Sonntag
Albert E. Bowen, Jr.
BY Curtis, Morris, & Safford
ATTORNEYS

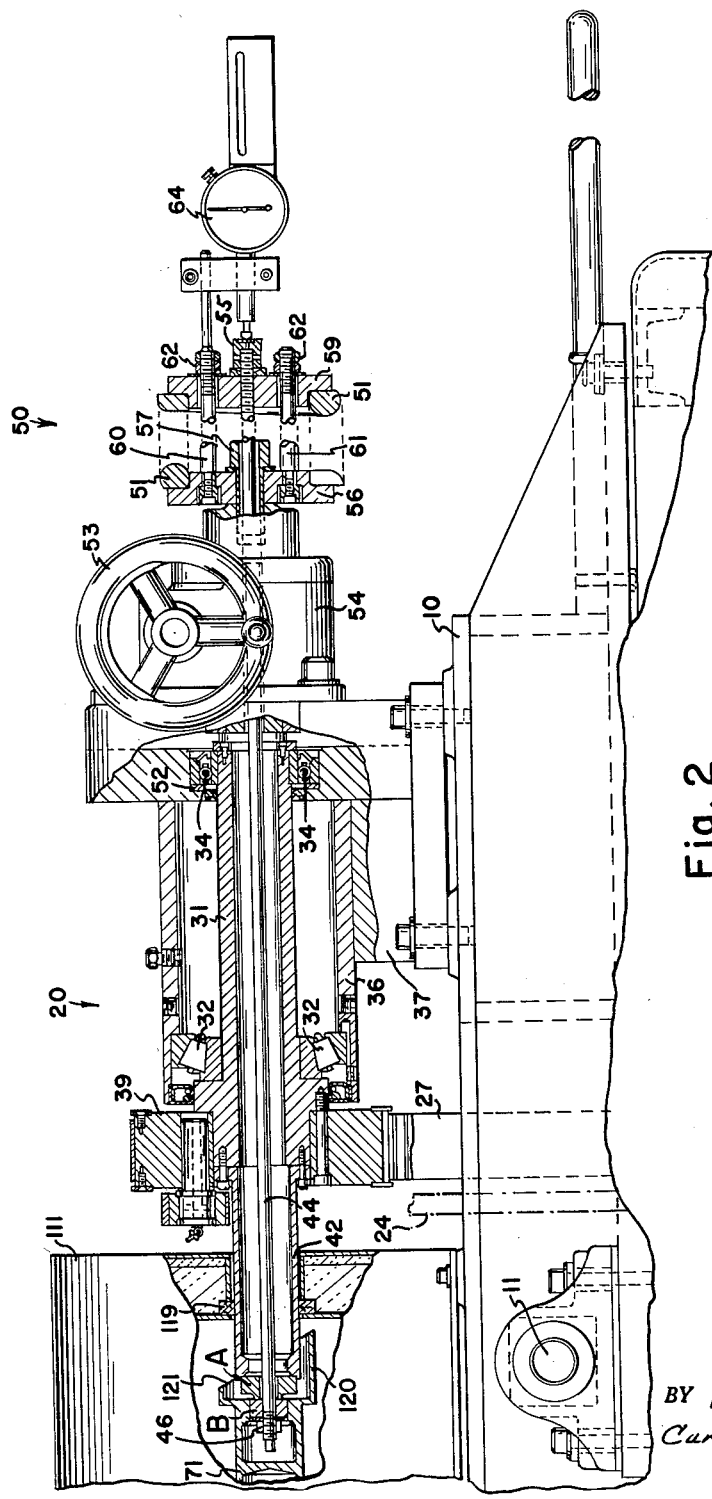

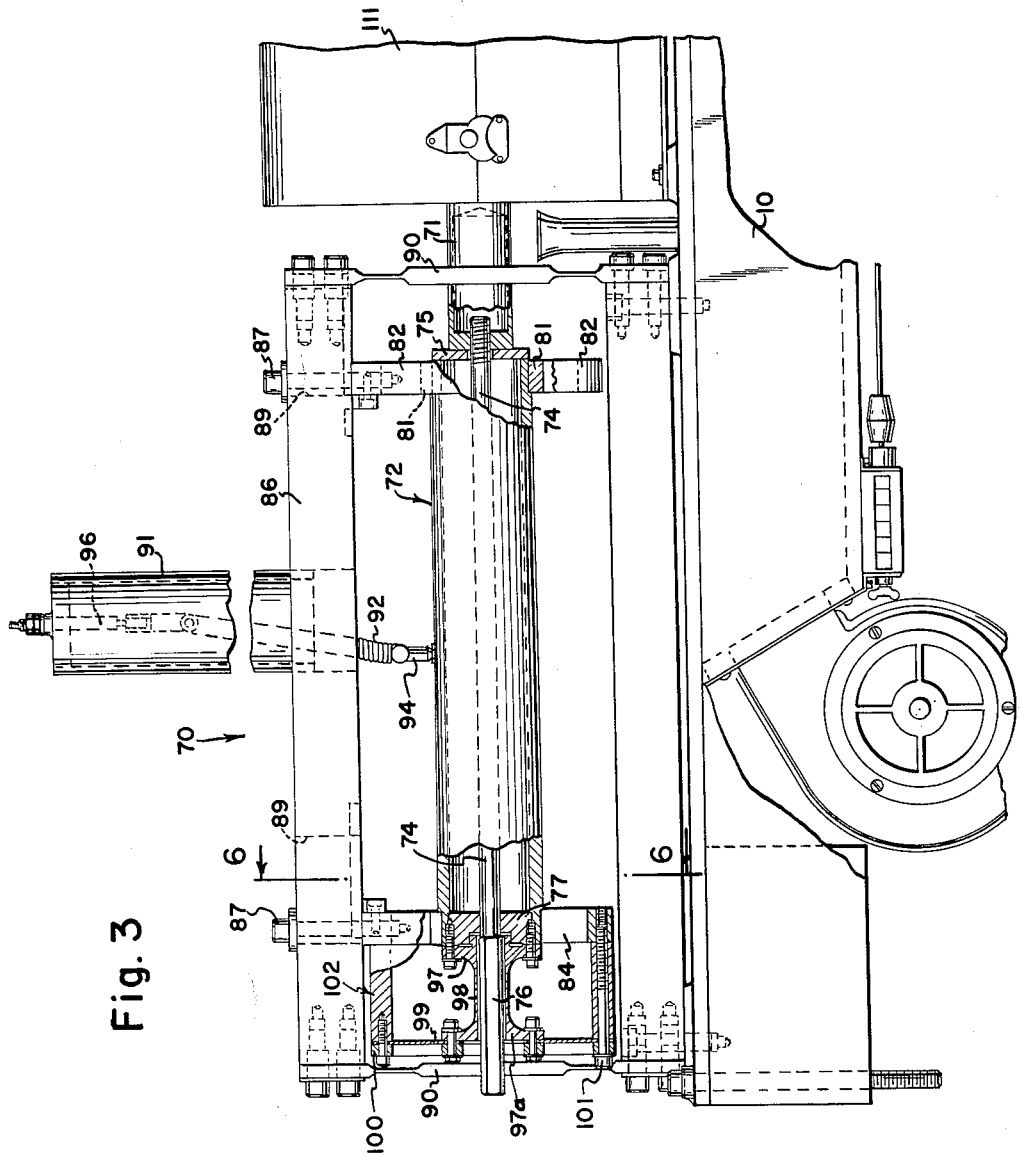

INVENTORS
Alfred Sonntag
BY Albert E. Bowen, Jr.

Curtis, Morris, & Safford
ATTORNEYS

United States Patent Office 3,166,927
Patented Jan. 26, 1965

3,166,927
LUBRICANT TESTING MACHINE
Alfred Sonntag, Greenwich, and Albert E. Bowen, Jr., Old Greenwich, Conn., assignors to The Alpha Molykote Corporation, Stamford, Conn.
Filed May 17, 1961, Ser. No. 110,700
11 Claims. (Cl. 73—10)

This invention relates to a machine for measuring resistance to relative motion between two surfaces, one of which has an angular movement relative to the other. It is useful particularly for comparative testing, under preselected environmental conditions, of lubricants and lubricant coatings that may be solid or fluid and has among its outstanding advantages the characteristics of extreme accuracy and reproducibility of test results.

Lubricant testing machines of the type that involve measurement of frictional force between test specimens have been subject to inherent inaccuracies despite attempts to observe close tolerances in the preparation of bearings and other moving parts that transmit load to the test specimens and sense the magnitude of the frictional forces thereby generated. It is extremely important, in order to obtain accurate test results with a machine having a specimen with an annular test surface pressed into contact with the annular test surface of another specimen rotated or angularly reciprocated on its axis, that (a) the axes of the two specimens are in alignment with one another, (b) the specimens are restrained to maintain a rigid mating path of motion, i.e., without run out, (c) the load applied to the contacting test surfaces is uniformly distributed over the entire contacting area of the angularly moving test specimens, (d) this distribution is automatically maintained regardless of deflections on the machine or uneven wear of the specimens, and (e) friction forces are transmitted to a dynamometer without frictional losses and without loss of radial rigidity.

In accordance with the present invention, a machine is provided for measuring resistance to relative angular motion between two annular test specimens. One of the specimens is fixed to the inner end of a hollow shaft that may be rotated or reciprocated about its longitudinal axis. The other is keyed but not otherwise fixed to the inner end of a second shaft having a longitudinal axis aligned with that of the first shaft. The second shaft is mounted for limited longitudinal movement relative to the first to permit mounting and replacement of the test specimens and engagement of their annular test surfaces with one another. It is preferably also hollow to minimize heat conduction. Means are provided within the first shaft for applying a preselected load between the test surfaces and within the second shaft for measuring the torque transmitted from the first to the second test specimen. In addition, means can be provided for measuring and, if desired, recording temperature changes in at least one of the test specimens.

The machine of the invention is adaptable for measuring torque transmission and heat generation between annular surfaces under a wide variety of conditions. Thus, for example, it is adaptable to testing solid and liquid lubricants, tests with liquid lubricants being conducted with the machine tilted so that the liquid lubricant can rest in a cup provided for that purpose. It is also adaptable for conducting tests under preselected conditions of temperature, pressure, humidity and other atmospheric conditions. For this purpose, the machine can be provided with a test chamber enclosing only the test specimens, any lubricant therefor and a small portion of the test apparatus. This chamber may be sealed, heated or cooled, and provided with any desired atmosphere, corrosive or otherwise, at elevated or reduced pressure.

The structural details, principles, advantages and utility of a mechanism constructed in accordance with the invention will become further apparent from the following detailed description of the test mode now contemplated for carrying out the invention, said description being made with reference to the accompanying drawing wherein:

FIGURE 2 is a cross sectional view in elevation showing the elements at one end of the machine in somewhat larger scale;

FIGURE 3 is a cross sectional view in elevation showing the elements at the other end of the machine in greater detail;

Figure 1:
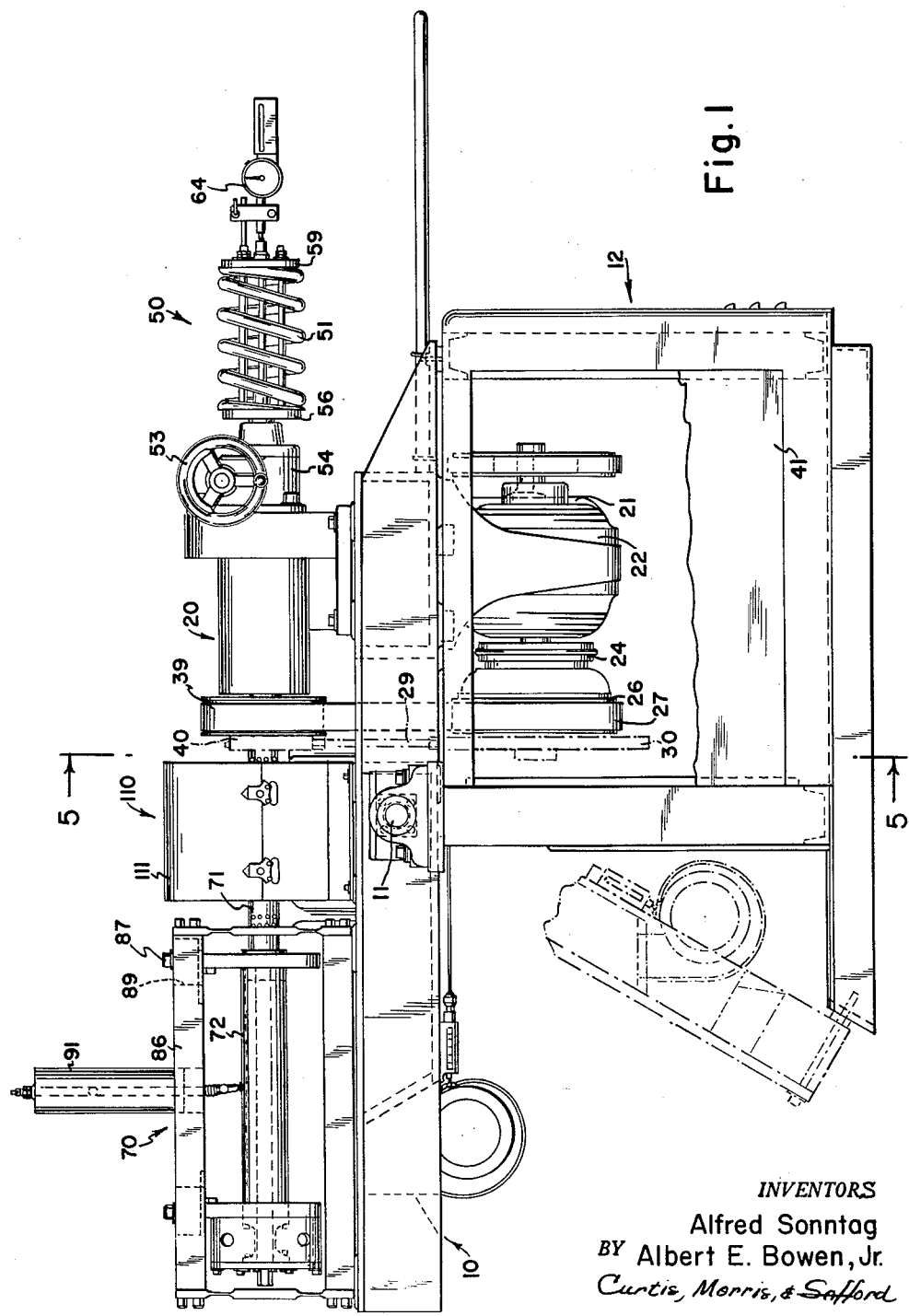
FIGURE 1 is a view in elevation of a complete testing machine in accordance with a preferred embodiment of the invention.

Referring now to FIGURE 1, illustrating a preferred embodiment of the machine in its entirety, the machine is mounted, at a convenient height above the floor, on a base plate 10 pivotally supported at 11 on a housing 12 and consists essentially of a driving mechanism 20, a loading mechanism 50, a torque measuring assembly 70, and a test zone 110.

The housing 12 encloses a variable speed motor 21 mounted on the underside of the base plate 10 for driving, through gear reducing and clutch mechanisms illustrated generally at 22 and 24, a pulley and bolt 26, 27, or, as shown in dotted lines, a crank 29 mounted on an adjustable eccentric 30.

Figure 5:
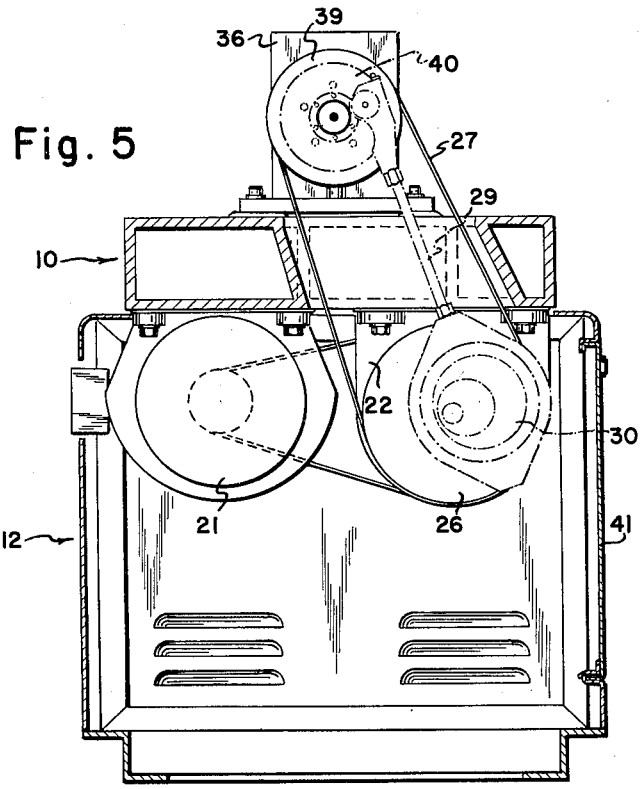
FIGURE 5 is a detailed cross sectional view taken on section line 5—5 of FIGURE 1.

Power, transmitted from the motor 21 to the driving mechanism 20 by way of a timing belt 27 as best shown in FIGURES 1 and 2, is applied to a hollow drive shaft 31, rotatable in bearings 32 and 34 and supported by a frame work 36, 37 which in turn is fixed to the base plate 10, through a suitable sheave 39. If oscillation rather than continuous rotation of the hollow shaft 31 is desired, the belt 27 is eliminated and the power flow is through an eccentric 30, crank arm 29 and crank wheel 40 fixed to sheave 39, as shown in dotted lines in FIGURES 1 and 5. A removable cover plate 41 for the housing 12 provides ready access to the driving means mounted on the underside of the base plate 10.

The hollow drive shaft 31 carries a hollow drive shaft extension 42 which extends into the test zone 110 and carries, for rotary or angular oscillation, at and with its inner end, a first test specimen A. The test specimen A is engaged by a second and relatively stationary test specimen B keyed into the inner end of a second hollow shaft 71 entering the test zone 110 from the opposite side. A loading rod 44 carrying a hand-tightened retaining nut 46 pulls the second test specimen B against the first test specimen A with a preselected initial load or preload, e.g., 100 pounds, applied by tightening a nut 55 at the outer end of rod 44 against a compression spring 51 in the loading mechanism 50 at the right side of the machine, as viewed in FIGURES 1 and 2, until the plate member 59 is freed from contact with stop nut and washer assemblies 62. A spring washer 52 is provided between bearing 34 and frame 36 to compensate for contraction or expansion of shaft 31 between bearings 32 and 34, thereby to maintain a preload on bearing 32.

The load applied to the test specimen B against the test specimen A by way of loading rod 44 and retaining nuts 46 and 55 is adjusted by turning a crank 53 operating a worm gear 54 which moves a first spring plate 56 and a hollow bolt 57. The spring plate 56, if moved outwardly for example, increases the pressure of spring 51 against a second plate member 59 threaded on or otherwise fixed to the outer end of bar 44, and thereby increases the load between specimens A and B. The second plate member 59 is slidable on bar members 60 and 61, both of which are provided with stop nut and washer assemblies 62 which permit release of tension on loading rod 44 by operation of crank 53 until nut 55 can be released so that the specimens A and B can be replaced and preloaded or rod 44 can be replaced. The bar member 60 extends as shown to support a measuring gauge 64 which may, if desired, be calibrated in terms of load.

It will be noted that the load between the two test specimens creates a closed loop of force in which the load applied to specimen A is transmitted to shaft extension 42, hollow drive shaft 31 and thrust bearing 32 to the frame 36 and from specimen B through loading bar 44, plate member 59, spring 51, plate member 56, worm gear 54 and frame 36, thus confining the loading forces and eliminating the necessity of absorbing a reacting load outside the machine proper.

Figure 4:
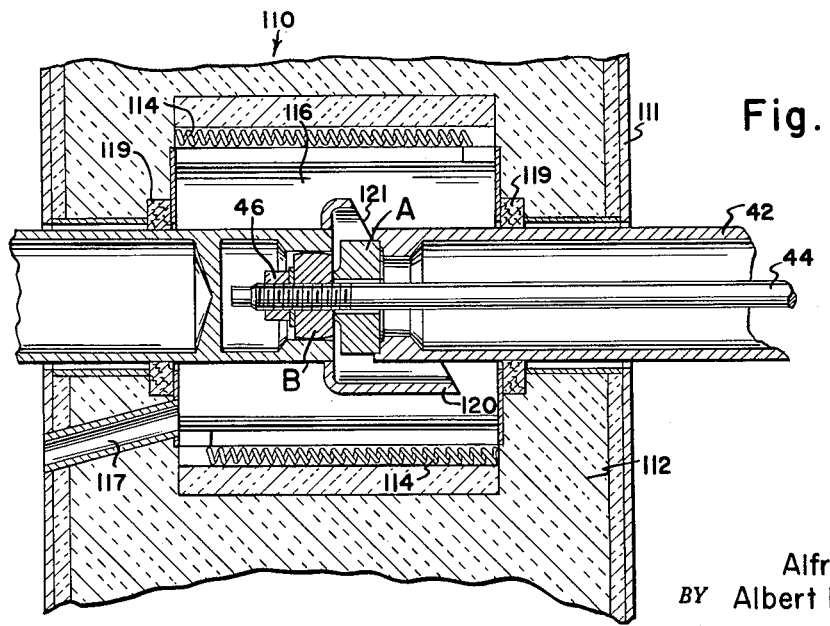
FIGURE 4 is a fragmentary view, in still greater detail, showing the assembly of parts for supporting test specimens in test position within a test chamber.
Figure 6:
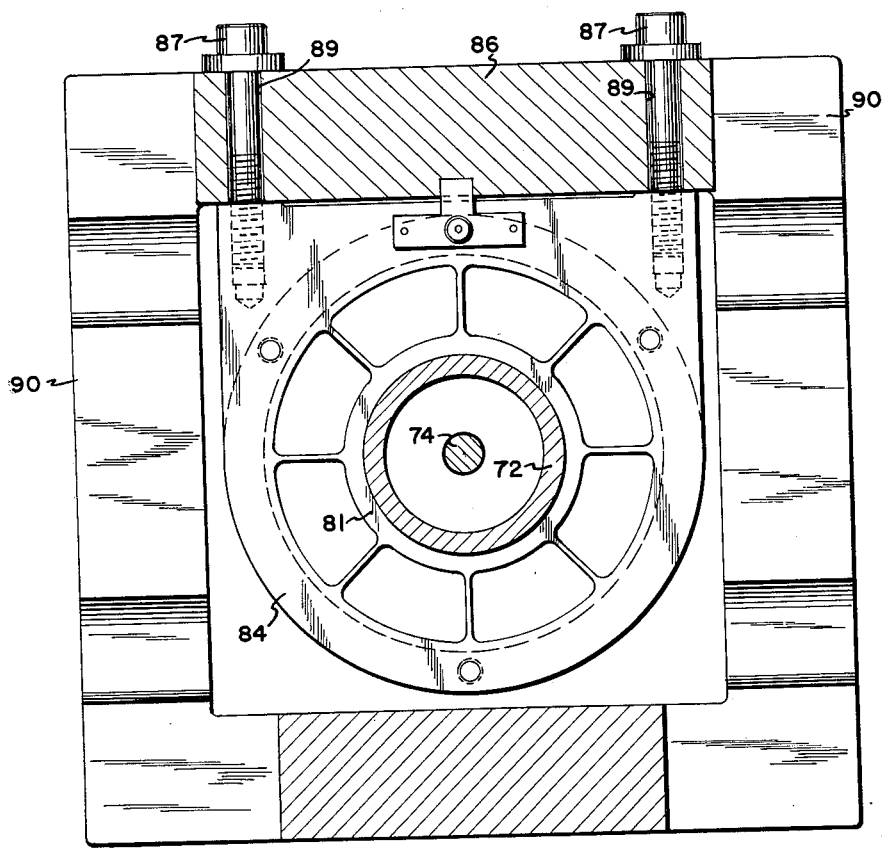
FIGURE 6 is a detailed cross sectional view taken on section line 6—6 of FIGURE 3.

Referring now to FIGURES 3, 4, and 6, the hollow shaft 71 extending into the test zone 110 is advantageously secured to a torque tube 72 in the torque measuring assembly 70 by means of a rod 74 carrying a flange bearing 75 and having one end threaded into the shaft 71, the other end 76 being rotatable in a disk 77 within tube 72. To allow accurate calibration and measurement of torque without error due to friction loss, the torque tube 72 is press fitted into hubs 81 of radial flex plates 82 and 84. These are suspended from an upper member 86 and secured thereto by bolts 87 laterally slidable in slots 89 to permit axial longitudinal adjustment of the torque tube assembly 71, 72 from an operating position (shown in FIGURES 1 and 2) to a retracted position (shown in FIGURE 3). The upper member 86 is supported on flex plates 90 to permit slight longitudinal movement of torque tube 72 at radial flex plate 82 that may be caused by temperature or other changes. Upper member 86 also carries a housing 91 for a spring 92 attached to the torque tube 72 at 94 and to the housing 91 by an adjusting means 96 to compensate for the weight of the torque tube 72 and radial flex plates 82 and 84 when bolts 87 are loosened to permit insertion of hollow shaft 71 into the test zone and withdrawal therefrom.

The outer end of torque tube 72 is bolted to one flange 97 of a dynamometer 98 the other flange 97a of which is in turn bolted to a diaphragm 99 mounted on the rim of radial flex plate 84 by means of a ring 100, bolts 101 and spacer 102 to permit slight axial motion of the dynamometer flange 97 due to thermal expansion or contraction without however permitting any significant rotational movement of dynamometer flange 97a. This enables the torsional force transmitted by the torque tube 72 to be measured by strain gages suitably applied to the mid-portion of the dynamometer 98.

In order to permit testing under preselected atmospheric conditions at sub-normal or above normal pressures and temperatures, the test zone, indicated generally at 110, is preferably enclosed by an enclosure 111 as shown in FIGURES 1 and 2 and in greater detail in FIGURE 4. The test zone, in the preferred embodiment shown, is insulated by insulation 112 and heated or cooled by coil members 114 or any suitable equivalent thereof. The composition of the atmosphere within the test chamber 116 can be controlled by introduction or withdrawal of suitable gases by way of one or more conduits, such as conduit 117, and the atmosphere within the chamber 116 is effectively sealed from the exterior by means of seals indicated diagrammatically at 119. In order to permit testing of liquid lubricants a cup member 120 is suitably mounted on the inner end of shaft 71 and the entire machine is pivoted to the upright position, indicated diagrammatically and in phantom in FIGURE 1, about the pivot 11 until the open end 121 of the cup 120 is approximately horizontal.

The test chamber 116 is also suitably provided with means, such as thermocouples or pressure sensing means, for determining and recording the temperature and/or pressure of the test chamber and, if desired, also the temperature of specimen B.

When it is desired to replace the test specimens, the test enclosure is simply opened and the hollow shaft 71, torsion tube 72 assembly is moved to the left, i.e., the position shown in FIGURE 3, whereupon test specimens A and B can both be removed from the loading rod 44 and replaced after the retaining nut 46 has been removed from the rod.

It will readily be understood that, due to the construction of the machine described, the load applied between the test specimens will be distributed uniformly over the entire area of contact and that wobbling is inherently reduced to a minimum to minimize run out in the specimen contact area. The radial flex members 82 and 84 of the torque measuring assembly 70 permit transmission of the torque from shaft 71 to the dynamometer without friction loss and without wobbling of the torsion tube 72.

Furthermore, it will be apparent that while the radial flex members absorb some of the torque originating in friction in the specimen contact area, this loss is readily compensated by suitably calibrating the entire assembly.

It will also be understood that the loading rod 44, by virtue of its great length in comparison with its relatively small diameter, has the inherent ability of compensating, by slight bending, for minute irregularities that inevitably occur in the mating test surfaces of specimens A and B. This represents a significant improvement over load applying means utilizing spherical seating arrangements designed to provide such compensation because it eliminates the need of such arrangements to overcome static frictional forces between spherical bearing surfaces before they can compensate for test surface irregularities.

We claim:

1. A machine for measuring resistance to relative motion between first and second annular test specimens which comprises a first hollow shaft angularly movable about its longitudinal axis, an inner end thereof being fixedly engageable with the first of said test specimens; a second hollow shaft in axial alignment with the first shaft having an end for receiving the second of said test specimens and provided with means for preventing relative rotation of said second specimen and said second shaft; means for maintaining said first and second test specimens in mating contact with one another; a flexible elongated tension member within and extending beyond the outer end of the first shaft for applying a preselected load to the second test specimen to exert pressure on the first test specimen; and means secured to the second shaft for sensing the torque transmitted from the first specimen to the second specimen upon angular movement of the first shaft.

2. A machine as defined in claim 1 wherein the first shaft is provided with means for rotating it about its longitudinal axis.

3. A machine as defined in claim 1 wherein the first shaft is provided with means for oscillating it about its longitudinal axis.

4. A machine as defined in claim 1 wherein adjustable tensioning means are provided for applying a preselected tensile load to the tension member.

5. A machine as defined in claim 1 wherein the second shaft is mounted for limited axial movement toward and away from the inner end of the first shaft.

6. A machine as defined in claim 1 wherein the ends of the first and second shafts carrying the test specimens extend into a test chamber.

7. A machine as defined in claim 1 wherein means are provided for maintaining a liquid medium between said first and second test specimens.

8. A machine as defined in claim 1 wherein the said first and second shafts, tension member and torque sensing means are mounted on a base plate pivotally secured to a stationary frame for tilting the machine to an upright position.

9. A machine as defined in claim 1 wherein the torque sensing means comprises radial flex plates capable of transmitting rotational force to a dynamometer without friction.

10. A machine as defined in claim 1 wherein the said first and second shafts, tension member and torque sensing means are mounted on a base plate pivotally secured to a stationary frame for tilting the machine to an upright position and a cup member is mounted on the end of the second hollow shaft for receiving and retaining a liquid lubricant when the machine is tilted to said upright position.

11. A machine for measuring resistance to relative motion between first and second annular test specimens which comprises a first hollow shaft angularly movable about its longitudinal axis, an inner end thereof being fixedly engageable with the first of said test specimens; a second hollow shaft in axial alignment with the first shaft having an end for receiving the second of said test specimens and provided with means for preventing relative rotation of said second specimen and said second shaft; means for maintaining said first and second test specimens in mating contact with one another; an elongated rod within and extending beyond the outer end of the first shaft for applying a preselected load to the second test specimen to exert pressure on the first test specimen, said rod having a modulus of elasticity sufficient to permit adjustment of the specimen-holding end thereof to adapt itself to slight disconformities in the contact interface between the first and second specimens; and means secured to the second shaft for sensing the torque transmitted from the first specimen to the second specimen upon angular movement of the first shaft.

References Cited in the file of this patent

UNITED STATES PATENTS

| | | |
|---|---|---|
| 1,490,603 | Elverson | Apr. 15, 1924 |
| 2,234,228 | Boccasile | Mar. 11, 1941 |
| 2,471,423 | Gisser | May 31, 1949 |
| 2,531,906 | Christian | Nov. 28, 1950 |
| 3,041,867 | Knudsen | July 3, 1962 |

OTHER REFERENCES

Publication: Automotive Industries, June 15, 1935, pages 802–803.